United States Patent
Meijer et al.

(10) Patent No.: US 8,185,082 B2
(45) Date of Patent: May 22, 2012

(54) FM RADIO RECEIVER

(75) Inventors: Pieter Meijer, Eindhoven (NL); Gerrit Groot Hulze, Eindhoven (NL); Jacobus C. Sandee, Eindhoven (NL)

(73) Assignee: NXP B.V., Eindhoven (NL)

( * ) Notice: Subject to any disclaimer, the term of this patent is extended or adjusted under 35 U.S.C. 154(b) by 693 days.

(21) Appl. No.: 12/162,812

(22) PCT Filed: Jan. 22, 2007

(86) PCT No.: PCT/IB2007/050206
§ 371 (c)(1),
(2), (4) Date: Sep. 8, 2008

(87) PCT Pub. No.: WO2007/088493
PCT Pub. Date: Aug. 9, 2007

(65) Prior Publication Data
US 2009/0023412 A1   Jan. 22, 2009

(30) Foreign Application Priority Data

Jan. 31, 2006  (EP) .................................... 06101104
Jan. 22, 2007  (WO) ................. PCT/IB2007/050206

(51) Int. Cl.
*H04B 1/26* (2006.01)

(52) U.S. Cl. ..................................... 455/313; 455/276.1
(58) Field of Classification Search .......... 455/313–334, 455/276–277.2, 186.1, 186.2
See application file for complete search history.

(56) References Cited

U.S. PATENT DOCUMENTS

| | | | |
|---|---|---|---|
| 5,280,638 A * | 1/1994 | Porambo et al. | 455/340 |
| 5,640,697 A * | 6/1997 | Orndorff | 455/315 |
| 6,359,944 B1 * | 3/2002 | Curtis et al. | 455/255 |
| 6,694,131 B1 | 2/2004 | Lakkis | |
| 7,133,082 B2 * | 11/2006 | Limberg | 455/353 |
| 7,423,699 B2 * | 9/2008 | Vorenkamp et al. | 455/314 |
| 7,558,545 B2 * | 7/2009 | Maejima | 455/183.1 |
| 2002/0197972 A1 | 12/2002 | Wong et al. | |
| 2003/0162522 A1 * | 8/2003 | Valtolina et al. | 455/314 |
| 2006/0094379 A1 * | 5/2006 | Gamo | 455/137 |
| 2007/0142009 A1 * | 6/2007 | Scarpa et al. | 455/132 |
| 2009/0270063 A1 * | 10/2009 | Tuttle et al. | 455/333 |

* cited by examiner

*Primary Examiner* — Lana N Le

(57) ABSTRACT

A diversity FM radio receiver comprises two tuners for simultaneously tuning to the same FM channel. To avoid disturbances between the local oscillator signals of the tuners and to be able to use standard IF filters, one of the tuners operate with high-side LO injection and the other tuner operates with low-side LO-injection. To equalize the frequencies of the signals to be subjected to the diversity operation the two IF-signals of the tuners are fed to complex mixers with oppositely rotating phases.

8 Claims, 1 Drawing Sheet

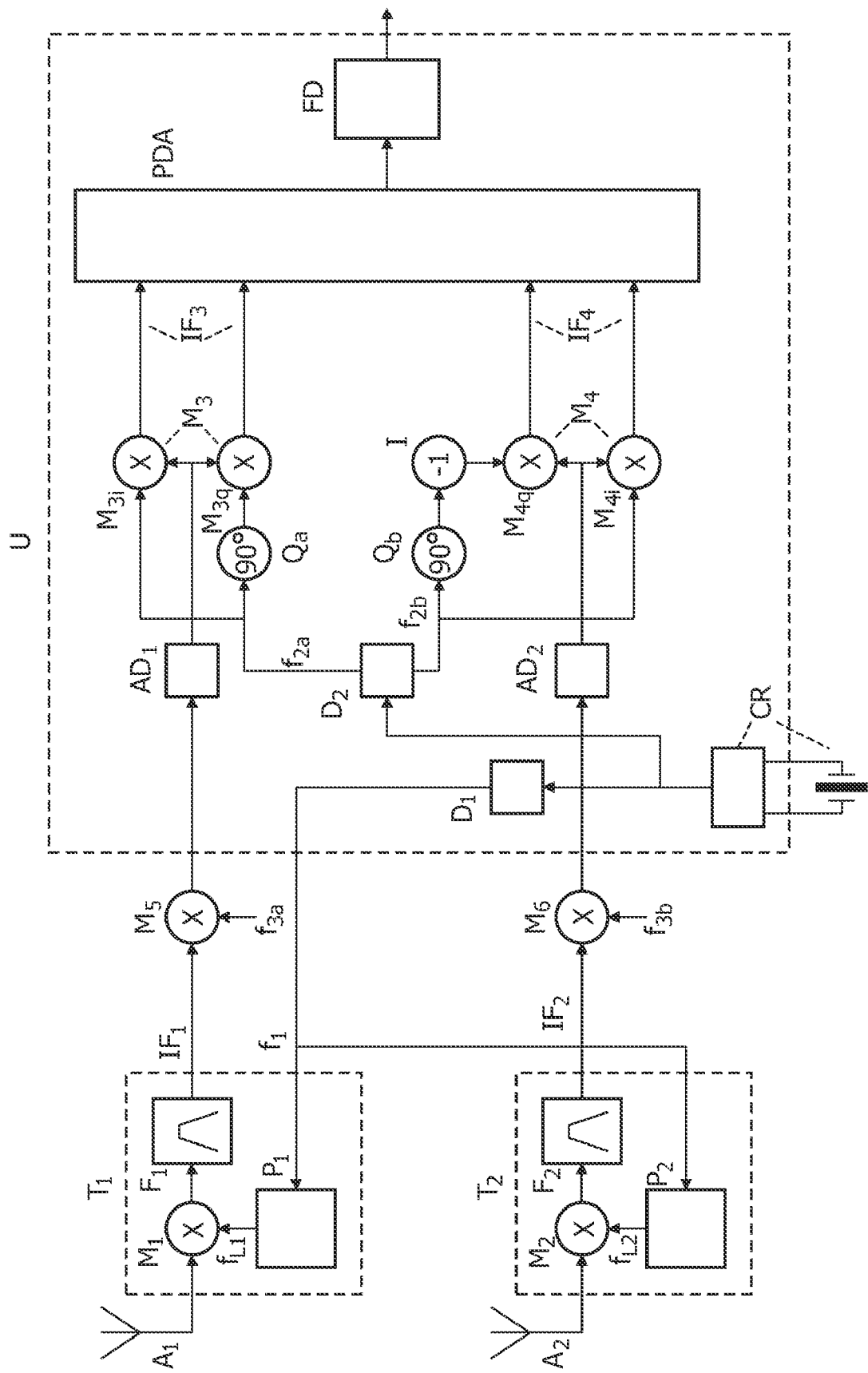

FM RADIO RECEIVER

The invention relates to an FM radio receiver comprising first and second tuners that are both arranged for tuning the radio receiver simultaneously to the same radio frequency channel signal and that convert said radio frequency channel signal to first and second IF-signals respectively, and a signal processor performing a diversity algorithm for deriving an improved modulated signal from both said first and second IF-signals.

Such radio receivers, especially radio receivers for car-radio applications, are known, for instance from the Blaupunkt car-radio San-Francisco CD72, to improve FM-reception under multipath conditions. Such so-called diversity receiver requires two tuners each with its own antenna. In diversity mode these two tuners are tuned to the same channel frequency. A straightforward solution for such receiver would be to have the two local oscillators on both tuners running at the same frequency. However, this will cause problems due to the nature of the PLL/VCO system. With the two VCO's running at the same frequency, the PLL of one tuner affects the PLL on the other tuner and vice versa. Depending on the amount of coupling between the VCO's and depending on the PLL loop filter bandwidth, this results in audible tones after FM-demodulation and degrades the reception performance. This problem may be solved by carefully optimized tuner layout and shielding of the tuners to avoid VCO interference. However this solution requires very difficult optimization by iterative design and expensive shielding.

Another solution is to use only one PLL tuning system to drive both mixers. However this solution prevents the highly desirable possibility to use the two tuners independently from each other in other modes than the diversity mode. Those other modes may include RDS-background scanning or updating the "Alternative Frequency" list of the receiver. In addition, the application of a solution where the high frequency LO signal has to be routed from one tuner to another is very critical and leads to degraded EMI performance.

A still other solution is to use completely different first and second intermediate frequencies which implies that different local oscillator frequencies can be used. This solution has the disadvantage that non-standard IF filters are needed and is therefore more expensive.

The present invention seeks to overcome the disadvantages of the prior art solutions and the FM radio receiver according to the invention is therefore characterized in that said first tuner mixes the channel signal with a local oscillator frequency which is by a certain IF frequency higher than the channel frequency and that the second tuner mixes the channel signal with a local oscillator frequency which is by approximately the same IF frequency lower than the channel frequency. Therefore both tuners convert the channel frequency to about a single IF frequency that is preferably the standard IF frequency of 10.7 MHz. With other words: one tuner uses "high side LO injection" while the other tuner uses "low side LO injection".

It may be noted that high/low side LO injection is per se known in the art. e.g. from US patent application publication US 2002/0197972 A1. In this application it is proposed to switch a single tuner between high and low side LO injection for optimal image rejection. In contradistinction therewith the present invention uses high and low side LO injection simultaneously in two tuners for diversity reception.

The invention may be used in receivers with antenna diversity and in receivers with phase diversity. In antenna diversity receivers the two IF-signals from the tuners are compared as to their quality and the best signal is selected for further processing. In phase diversity receivers the two IF signals are both applied to a (digital) signal processor in which a phase diversity algorithm derives an improved signal from both IF-signals. To allow proper phase diversity operation the two signals entering the phase diversity algorithm should have the same frequency as well for their central frequencies and for their frequency swing.

According to a further aspect of the invention the equality of the frequency swings is conveniently achieved in that both first and second IF-signals are converted to third and fourth IF-signals respectively by means of third and fourth complex mixers by means of local oscillator signals having with respect to each other oppositely rotating phases. Moreover, equality of the central frequencies of the third and fourth IF signals is conveniently obtained when the sum of the local oscillator frequencies of said third and fourth complex mixers, plus the sum of the local oscillator frequencies of any further mixing stages between the tuners and the third and fourth complex mixers, equals the difference between the local oscillator frequencies of the first and second tuners.

It is often preferred to digitally process intermediate frequency signals with low- or even zero-IF frequency. Such zero IF-frequency is obtained in an FM-radio receiver according to the invention when the local oscillator frequency of said third complex mixer plus the local oscillator frequency of any further mixer stage between the first tuner and the third complex mixer substantially equals the intermediate frequency of the first IF signal and that the local oscillator frequency of said fourth complex mixer plus the local oscillator frequency of any further mixer stage between the second tuner and the fourth complex mixer substantially equals the intermediate frequency of the second IF signal.

The invention will be further explained with reference to the annexed figure that shows an FM radio receiver for phase diversity operation in accordance with the teachings of the present invention.

The phase diversity receiver shown in the figure comprises two tuners $T_1$ and $T_2$, each having a mixer $M_1$, $M_2$, an IF filter $F_1$, $F_2$ and a phase-locked-loop voltage-controlled local oscillator combination $P_1$, $P_2$. The two PLL-VCO combinations receive a fixed clock-controlled frequency $f_1$ from a semiconductor unit U. The mixer $M_1$ receives a plurality of channel signals from an antenna $A_1$ and converts a desired channel $f_s$ with the LO-frequency $f_{L1}$ from the PLL-VCO $P_1$ to an intermediate frequency signal $IF_1$ where $IF_1 = f_{L1} - f_s$. The mixer $M_2$ receives the same plurality of channel signals from an antenna $A_2$ and converts the same desired channel $f_s$ with the LO-frequency $f_{L2}$ from the PLL-VCO $P_2$ to an intermediate frequency signal $IF_2$. In this case the signal $IF_2$ equals $f_s - f_{L2}$. Therefore, while the tuner $T_1$ operates with a local oscillator frequency $f_{L1}$ that is higher than the central frequency $f_s$ of the desired channel (high-side injection), the tuner $T_2$ operates with a local oscillator frequency $f_{L2}$ that is lower than the central frequency $f_s$ of the desired channel (low-side injection) so that the problems mentioned in the introductory part of this application are avoided.

For the time being disregarding the two mixers $M_5$ and $M_6$, the intermediate frequency signal $IF_1$ is digitized in an AD converter $AD_1$ and the digital signal is subsequently applied to a complex mixer $M_3$ where the signal $IF_1$ is converted with a complex oscillator signal of frequency $f_{2a}$ to a complex signal $IF_3$. The complex mixer $M_3$ comprises an in-phase mixer $M_{3i}$ where the signal $IF_1$ is multiplied with an in-phase component of the oscillator signal $f_{2a}$ and a quadrature-phase mixer $M_{3q}$ where the signal $IF_1$ is multiplied with an oscillator signal of frequency $f_{2a}$ that is 90° phase shifted by a phase shifter $Q_a$. The complex signal $IF_3$ is subsequently applied to a phase-diversity algorithm unit PDA and the result of this operation is fed to an FM-demodulator FD.

Also the intermediate frequency signal $IF_2$ is digitized in an AD-converter $AD_2$ and the so digitized signal is applied to a complex mixer $M_4$ wherein the signal is converted with a complex oscillator signal of frequency $f_{2b}$ to a complex signal $IF_4$. Therefore the mixer $M_4$ comprises an in-phase mixer $M_{4i}$ where the signal $IF_2$ is mixed with an in-phase component of the oscillator signal with frequency $f_{2b}$ and a quadrature mixer $M_{4q}$ where the signal $IF_2$ is multiplied with an oscillator signal of frequency $f_{2b}$ that is 90° phase shifted by a phase shifter $Q_b$. Also the complex signal $IF_4$ is applied to the phase diversity algorithm unit PDA. The frequencies $f_1$, $f_{2a}$ and $f_{2b}$ are derived from a crystal oscillator CR by means of frequency dividers $D_1$ and $D_2$ respectively.

The function of the complex mixers $M_3$ and $M_4$ is twofold. The first function is to convert the intermediate frequency signals $IF_1$ and $IF_2$ of e.g. 10.7 MHz down to zero-IF or low-IF signals that are suitable for being handled by the digital signal processor with the phase diversity algorithm.

The second function is to convert the two intermediate frequency signals $IF_1$ and $IF_2$ to signals $IF_3$ and $IF_4$ that are equal in frequency. Because the conversion in the tuner $T_1$ uses high-side LO injection and that of tuner $T_2$ uses low side LO injection, a frequency shift in the FM channel signal $f_1$ will be in one direction in the IF signal from one tuner and in the opposite direction in the IF signal from the other tuner. To deal with this problem the quadrature $f_{2b}$-signal applied to the $M_{4q}$ mixer is inverted with respect to the quadrature $f_{2a}$-signal applied to the $M_{3q}$ mixer. This is indicated in the figure with an inverter I in the connection between the between the phase shifter $Q_b$ and the mixer $M_{4q}$. It may be noted that the 90° phase-shifters $Q_a$, $Q_b$ and the inverter I in the figure are for illustration purposes only. In practice the divider $D_2$ may provide the in-phase components of the $f_{2a}$- and $f_{2b}$-signals, the quadrature component of the $f_{2a}$-signal as well as the inverted quadrature component of the $f_{2b}$-signal. It may also be noted that alternative possibilities exist: e.g. to supply non-inverted quadrature signals to both the $M_{3q}$ and $M_{4q}$ mixers, to supply an inverted in-phase $f_{2b}$-signal to in-phase mixer $M_{4i}$ and to place an inverter in the signal path to one of the complex mixers.

The following calculation may clarify the operation of the receiver as shown.

When the signal $IF_1 = \cos 2\pi(f_{L1}-f_s)t$, written in complex notation:

$$IF_1 = \frac{1}{2}\exp(j2\pi(f_{L1} - f_s)t) + \frac{1}{2}\exp(-j2\pi(f_{L1} - f_s)t)$$

is multiplied by the complex $f_{2a}$ signal $\exp(j2\pi.f_{2a}t)$ applied to the complex mixer $M_3$, the result for the difference frequency thereof is:

$$IF_3 = \frac{1}{2}\exp(j2\pi(f_s - f_{L1} + f_{2a})t).$$

Equally when the signal $IF_2 = \cos 2\pi(f_s - f_{L2})t$, written in complex notation:

$$IF_2 = \frac{1}{2}\exp(j2\pi(f_s - f_{L2})t) + \frac{1}{2}\exp(-j2\pi(f_s - f_{L2})t)$$

is multiplied by the complex $f_{2b}$ signal $\exp(-j2\pi.f_{2b}t)$ applied to the complex mixer $M_4$, the result for the difference frequency is:

$$IF_4 = \frac{1}{2}\exp(j2\pi(f_s - f_{L2} - f_{2b})t).$$

From this it follows that $IF_3$ and $IF_4$ are equal if $f_s-f_{L1}+f_{2a}=f_s-f_{L2}-f_{2b}$ or that these two signals are equal, for the central frequency and all other values of the varying signal frequency $f_s$, if $f_{2a}+f_{2b}=f_{L1}-f_{L2}$. With other words: the sum of the oscillator frequencies $f_{2a}$ and $f_{2b}$ for the complex mixers $M_3$ and $M_4$ should be equal to the distance between the local oscillator frequencies $f_{L1}$ and $f_{L2}$ of the two tuners.

Although the LO frequencies $f_{L1}$ and $f_{L2}$ vary with the tuning of the receiver it is not difficult to fulfill this requirement because the four frequencies $f_{2a}$, $f_{2b}$, $f_{L1}$ and $f_{L2}$ are all derived from the same clock frequency.

In practice the standard frequency of 10.7 MHz of the two signals $IF_1$ and $IF_2$ is too high for easily converting them into digital signals in the AD converters $AD_1$ and $AD_2$. This may be solved by down converting the 10.7 MHz signals in intermediary mixing stages $M_5$ and $M_6$ with oscillator frequencies $f_{3a}$ and $f_{3b}$ respectively. In that case the above given condition for equating the central frequencies of the signals $IF_3$ and $IF_4$ reads: $f_{2a}+f_{2b}+f_{3a}+f_{3b}=f_{L1}-f_{L2}$.

When this condition $f_{2a}+f_{2b}+f_{3a}+f_{3b}=f_{L1}-f_{L2}$ is fulfilled, the central frequency of the signals IF3 and IF4 is $f_s-f_{L1}+f_{2a}+f_{3a}$ and $f_s-f_{L2}-f_{2b}-f_{3b}$. It is desirable to make this frequency equal to zero because then IF3 and IF4 are zero-IF signals that can easily be filtered digitally by means of low pass filters. In that case $f_{L1}-f_s=f_{2a}+f_{3a}$ and $f_s-f_{L2}=f_{2b}+f_{3b}$. This is most easily fulfilled if $f_{2a}=f_{2b}=f_2$ and $f_{3a}=f_{3b}=f_3$ and $f_s=(f_{L1}+f_{L2})/2$. From the last given equation it follows that then the central frequency of the channel signal should lie exactly in the middle between the two local oscillator frequencies. This will usually not be the case because the two local oscillator frequencies are derived from the crystal oscillator CR and the central frequency of the channel signal is not. Making the dividers $D_1$ and $D_2$ variable in sufficiently small steps and more particularly implementing these dividers as fractional dividers may solve this problem.

The invention claimed is:

1. An FM radio receiver comprising:
   first and second tuners that are both arranged for tuning the radio receiver simultaneously to the same radio frequency (RF) channel signal and that convert said RF channel signal to first and second IF-signals respectively, each of the tuners having a voltage-controlled local oscillator (VCO) and a mixer; and
   a signal processor performing a diversity algorithm for deriving an improved modulated signal from both said first and second IF-signals;
   characterized in that said first tuner mixes the RF channel signal with a local oscillator frequency which is by a certain IF frequency higher than the frequency of the RF channel signal and that the second tuner simultaneously mixes the RF channel signal with a local oscillator frequency which is by approximately the same IF frequency lower than the frequency of the RF channel signal.

2. The FM radio receiver as claimed in claim 1 characterized in that the first and second IF-signals are converted to third and fourth IF-signals respectively by means of third and fourth complex mixers by means of local oscillator signals having with respect to each other oppositely rotating phases.

3. The FM radio receiver as claimed in claim 2 characterized in that the sum of the local oscillator frequencies of said third and fourth complex mixers, plus the sum of the local oscillator frequencies of any further mixing stages between the tuners and the third and fourth complex mixers, equals the difference between the local oscillator frequencies of the first and second tuners.

4. The FM radio receiver as claimed in claim 3 characterized in that the local oscillator frequency of said third complex mixer substantially equals the intermediate frequency of the first IF signal and that the local oscillator frequency of said fourth complex mixer substantially equals the intermediate frequency of the second IF signal.

5. The FM radio receiver as claimed in claim 3 characterized in that the local oscillator frequency of said third complex mixer plus the local oscillator frequency of any further mixer stage between the first tuner and the third complex mixer substantially equals the intermediate frequency of the first IF signal and that the local oscillator frequency of said fourth complex mixer plus the local oscillator frequency of any further mixer stage between the second tuner and the fourth complex mixer substantially equals the intermediate frequency of the second IF signal.

6. An FM radio receiver comprising:
   first and second tuners that are both arranged for tuning the radio receiver simultaneously to the same radio frequency (RF) channel signal and that convert said RF channel signal to first and second IF-signals respectively, each of the tuners having a voltage-controlled local oscillator (VCO) and a mixer; and
   a signal processor performing a diversity algorithm for deriving an improved modulated signal from both said first and second IF-signals;
   characterized in that said first tuner mixes the RF channel signal with a local oscillator frequency which is by a certain IF frequency higher than the frequency of the RF channel signal and that the second tuner mixes the RF channel signal with a local oscillator frequency which is by approximately the same IF frequency lower than the frequency of the RF channel signal; and
   characterized in that the first and second IF-signals are converted to third and fourth IF-signals respectively by means of third and fourth complex mixers by means of local oscillator signals having with respect to each other oppositely rotating phases; and
   characterized in that the sum of the local oscillator frequencies of said third and fourth complex mixers, plus the sum of the local oscillator frequencies of any further mixing stages between the tuners and the third and fourth complex mixers, equals the difference between the local oscillator frequencies of the first and second tuners.

7. The FM radio receiver as claimed in claim 6 characterized in that the local oscillator frequency of said third complex mixer substantially equals the intermediate frequency of the first IF signal and that the local oscillator frequency of said fourth complex mixer substantially equals the intermediate frequency of the second IF signal.

8. The FM radio receiver as claimed in claim 6 characterized in that the local oscillator frequency of said third complex mixer plus the local oscillator frequency of any further mixer stage between the first tuner and the third complex mixer substantially equals the intermediate frequency of the first IF signal and that the local oscillator frequency of said fourth complex mixer plus the local oscillator frequency of any further mixer stage between the second tuner and the fourth complex mixer substantially equals the intermediate frequency of the second IF signal.

\* \* \* \* \*